(12) United States Patent
Mossberg et al.

(10) Patent No.: US 8,270,079 B1
(45) Date of Patent: Sep. 18, 2012

(54) DECORATIVE, ORNAMENTAL, OR JEWELRY ARTICLES HAVING DIFFRACTION GRATINGS

(75) Inventors: Thomas W. Mossberg, Eugene, OR (US); Christoph M. Greiner, Eugene, OR (US); Dmitri Iazikov, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 615 days.

(21) Appl. No.: 12/271,683

(22) Filed: Nov. 14, 2008

Related U.S. Application Data

(60) Provisional application No. 61/003,434, filed on Nov. 15, 2007, provisional application No. 61/126,792, filed on May 6, 2008.

(51) Int. Cl.
*G02B 5/18* (2006.01)
(52) U.S. Cl. .................................... 359/567; 359/576
(58) Field of Classification Search .................. 359/567, 359/572, 576
See application file for complete search history.

(56) References Cited

U.S. PATENT DOCUMENTS

| | | | |
|---|---|---|---|
| 4,490,440 A | 12/1984 | Reber | |
| 4,604,329 A | 8/1986 | Reber | |
| 4,725,511 A | 2/1988 | Reber | |
| 5,080,465 A * | 1/1992 | Laude | 359/571 |
| 5,155,604 A | 10/1992 | Miekka et al. | |
| 5,377,044 A * | 12/1994 | Tomono et al. | 359/566 |
| 5,612,102 A | 3/1997 | Nakama | |
| 6,197,428 B1 | 3/2001 | Rogers | |
| 6,208,463 B1 * | 3/2001 | Hansen et al. | 359/485.05 |
| 6,713,842 B1 | 3/2004 | Manchester | |
| 6,839,173 B2 | 1/2005 | Shimmo et al. | |
| 6,987,590 B2 | 1/2006 | Phillips et al. | |
| 2002/0191286 A1 * | 12/2002 | Gale et al. | 359/486 |
| 2004/0021945 A1 * | 2/2004 | Tompkin et al. | 359/566 |
| 2004/0196556 A1 * | 10/2004 | Cappiello | 359/569 |
| 2005/0088739 A1 * | 4/2005 | Chiu et al. | 359/486 |
| 2007/0157667 A1 | 7/2007 | Maltezos et al. | |

OTHER PUBLICATIONS

U.S. Appl. No. 11/967,181, filed Dec. 29, 2007, Mossberg et al.
U.S. Appl. No. 12/175,459, filed Jul. 18, 2008, Mossberg et al.
Office action dated Sep. 23, 2010 in co-owned U.S. Appl. No. 11/967,181.
Office action dated Mar. 24, 2011 in co-owned U.S. Appl. No. 11/967,181.
Office action dated Jan. 14, 2011 in co-owned U.S. Appl. No. 12/175,459.

* cited by examiner

*Primary Examiner* — Stephone Allen
*Assistant Examiner* — Kimberly N Kakalec
(74) *Attorney, Agent, or Firm* — David S. Alavi

(57) ABSTRACT

A first article has a surface bearing a diffraction grating that comprises a plurality of elevated regions and recessed regions and a reflective coating that provides reflective diffraction within the article but is sufficiently thick to prevent diffraction outside the article. Alternatively, the reflective coating can be arranged to also provide reflective diffraction outside the article. A second article has a surface bearing a diffraction grating that comprises a plurality of elevated regions and recessed regions. Either (i) at least a portion of each ridge, or (ii) at least portion of each trench, comprises a material differing with respect to its refractive index or with respect to its optical transmissivity.

19 Claims, 12 Drawing Sheets

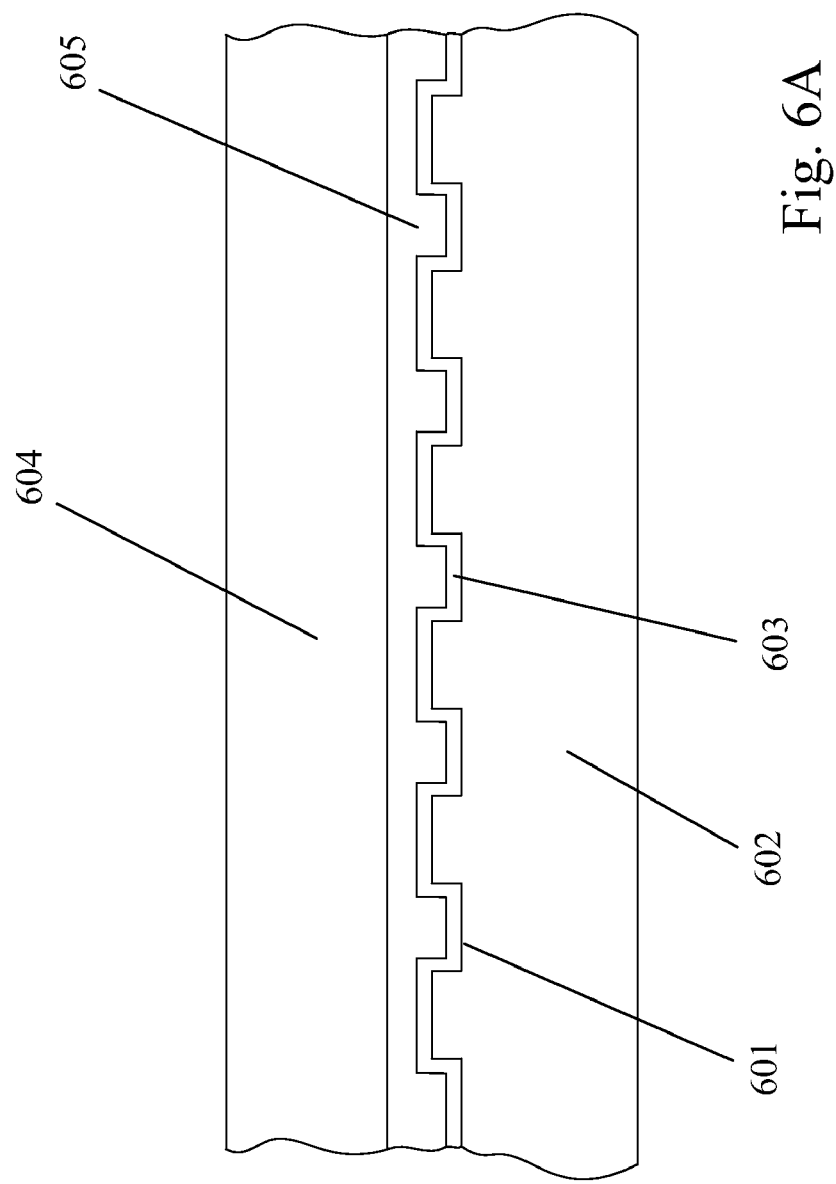

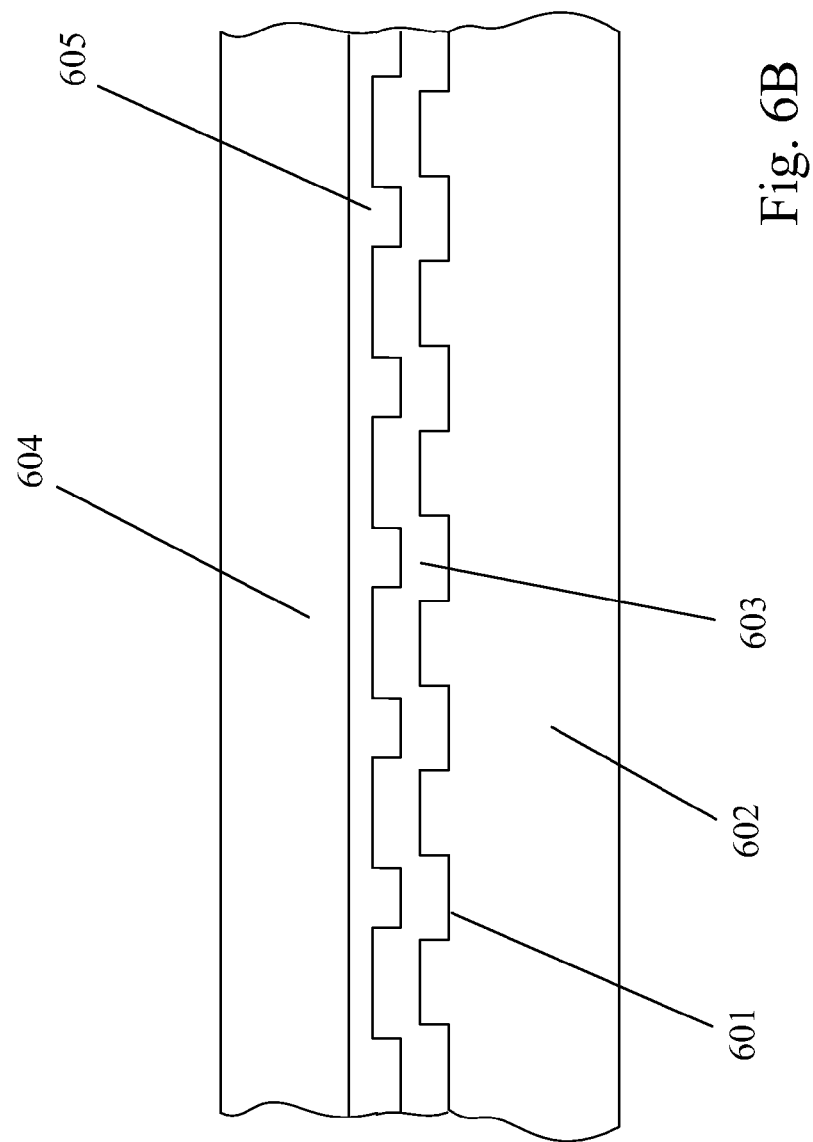

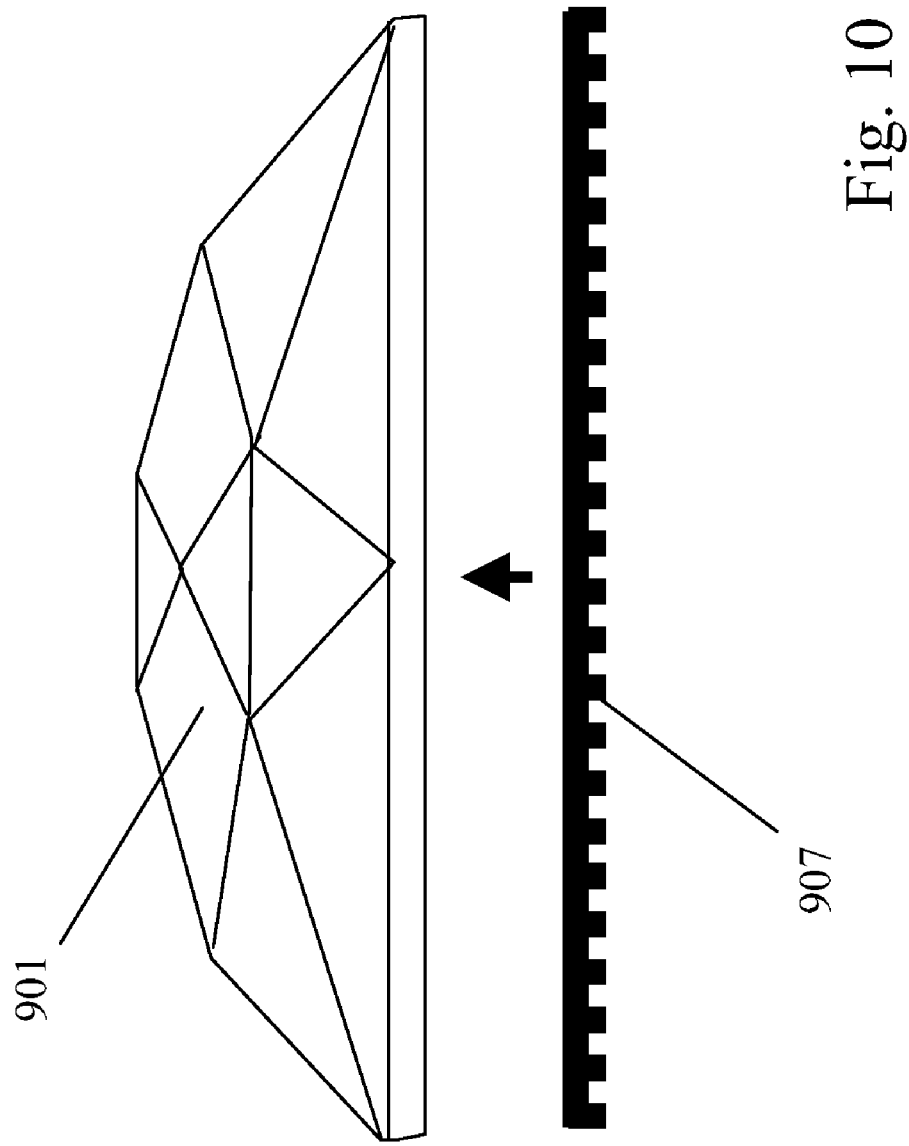

:
DECORATIVE, ORNAMENTAL, OR JEWELRY ARTICLES HAVING DIFFRACTION GRATINGS

BENEFIT CLAIMS TO RELATED APPLICATIONS

This application claims benefit of: (i) U.S. provisional App. No. 61/003,434 filed Nov. 15, 2007, and (ii) U.S. provisional App. No. 61/126,792 filed May 6, 2008. Each of said provisional applications is hereby incorporated by reference as if fully set forth herein.

BACKGROUND

The field of the present invention relates to jewelry and other decorative or ornamental articles. In particular, jewelry and other decorative or ornamental articles are disclosed herein that have arrays of diffraction gratings.

A variety of decorative or ornamental articles, including jewelry items, have been described that include one or more diffraction gratings. Some of these are described in:
U.S. Pat. No. 4,490,440 entitled "High technology jewelry and fabrication of same" issued Dec. 25, 1984 to Reber;
U.S. Pat. No. 4,604,329 entitled "High technology decorative materials and fabrication of same" issued Aug. 5, 1986 to Reber;
U.S. Pat. No. 4,725,511 entitled "High technology decorative materials for watchfaces and fabrication of same" issued Feb. 16, 1988 to Reber;
U.S. Pat. No. 5,612,102 entitled "Faceted jewelry ornament with facet grooved for light diffraction" issued Mar. 18, 1997 to Nakama;
U.S. Pat. No. 6,713,842 entitled "Mask for and method of forming a character on a substrate" issued Mar. 30, 2004 to Manchester; and
U.S. Pub. No. 2007/0157667 A1 entitled "Enhancing the optical characteristics of a gemstone" published Jul. 12, 2007 in the name of Maltezos et al.

None of those references discloses jewelry or other decorative or ornamental articles having arrays of diffraction gratings, one or more of which is arranged to diffract, at one or more designed diffraction angles, substantially white light or light having a desired color composition. None of those references discloses jewelry or other decorative or ornamental articles having arrays of diffraction gratings, one or more of which is arranged to focus light it diffracts. None of those references discloses jewelry or other decorative or ornamental articles wherein light from a moving source is diffracted from a designed succession of gratings of the array that are arranged on a substantially planar surface of an article, e.g., so as to simulate the appearance of a three-dimensional faceted article illuminated by the moving light source or to provide a dynamically pleasing appearance. None of those references discloses jewelry or other decorative or ornamental articles wherein diffracted light intensity varies among gratings of the array that are arranged on a substantially planar surface of an article, e.g., so as to simulate the appearance of a three-dimensional article illuminated by a light source. None of those references discloses jewelry or other decorative or ornamental articles wherein light is scattered from boundary regions between gratings of the array. None of those references discloses jewelry or other decorative or ornamental articles having diffraction gratings formed in deformable layers on a surface of a curved or faceted article.

It may be desirable to provide jewelry or other decorative or ornamental articles having arrays of diffraction gratings that exhibit one or more of the aforementioned characteristics. In the creation of visually pleasing decorative, ornamental, or jewelry articles utilizing diffractive structures, it can be desirable to identify structures or fabrication methods that lead to robust, attractive, high-quality items while limiting, reducing, or minimizing manufacturing costs. Various diffraction grating arrangements are disclosed herein that are amenable to lower-cost fabrication methods or result in high-quality or robust decorative, ornamental, or jewelry articles bearing diffraction gratings.

The subject matter of the instant application may be related to that of U.S. provisional App. No. 60/877,901 filed Dec. 29, 2006, U.S. provisional App. No. 60/918,383 filed Mar. 16, 2007, and U.S. non-provisional application Ser. No. 11/967,181 filed Dec. 29, 2007. Each of said applications is hereby incorporated by reference as if fully set forth herein.

The subject matter of the instant application may be related to that of U.S. provisional App. No. 60/950,562 filed Jul. 18, 2007 and U.S. non-provisional application Ser. No. 12/175,459 filed Jul. 18, 2008. Each of said applications is hereby incorporated by reference as if fully set forth herein.

SUMMARY

A first article comprises a volume of a first dielectric material having at least one surface bearing at least one optical diffraction grating. The first dielectric material is substantially transparent over at least a portion of the visible electromagnetic spectrum. The diffraction grating comprises a plurality of elevated regions and recessed regions. The diffraction grating further comprises a reflective coating formed on the elevated regions and recessed regions. The reflective coating can be sufficiently thick so as to substantially fill the recessed regions and cover the elevated regions and thereby substantially prevent diffraction by the elevated regions and recessed regions of light incident on the reflective coating from outside the first dielectric material. Alternatively, the article can further comprise a second dielectric material on the grating that is sufficiently thick so as to substantially fill the recessed regions and cover the elevated regions. In that case the reflective layer is arranged so as to enable diffraction of light incident on the reflective coating through the second dielectric material.

A second article comprises at least one surface bearing at least one optical diffraction grating. The article comprises a first dielectric material that is substantially transparent over at least a portion of the visible electromagnetic spectrum. The diffraction grating comprises a plurality of elevated regions and recessed regions. Either (i) at least a portion of each ridge, or (ii) at least portion of each trench, comprises a second material. The second dielectric material differs from the first dielectric material with respect to its refractive index or with respect to its optical transparency (equivalently, optical transmissivity) over the transparent spectral region of the first dielectric material.

Objects and advantages pertaining to decorative, ornamental, or jewelry articles having diffraction gratings may become apparent upon referring to the exemplary embodiments illustrated in the drawings and disclosed in the following written description or appended claims.

BRIEF DESCRIPTION OF THE DRAWINGS

FIGS. 6A and 6B are schematic cross-sectional views of other exemplary diffraction gratings.

FIG. 10 illustrate schematically a method for making an article with a diffraction gratings.

Figure 1A:
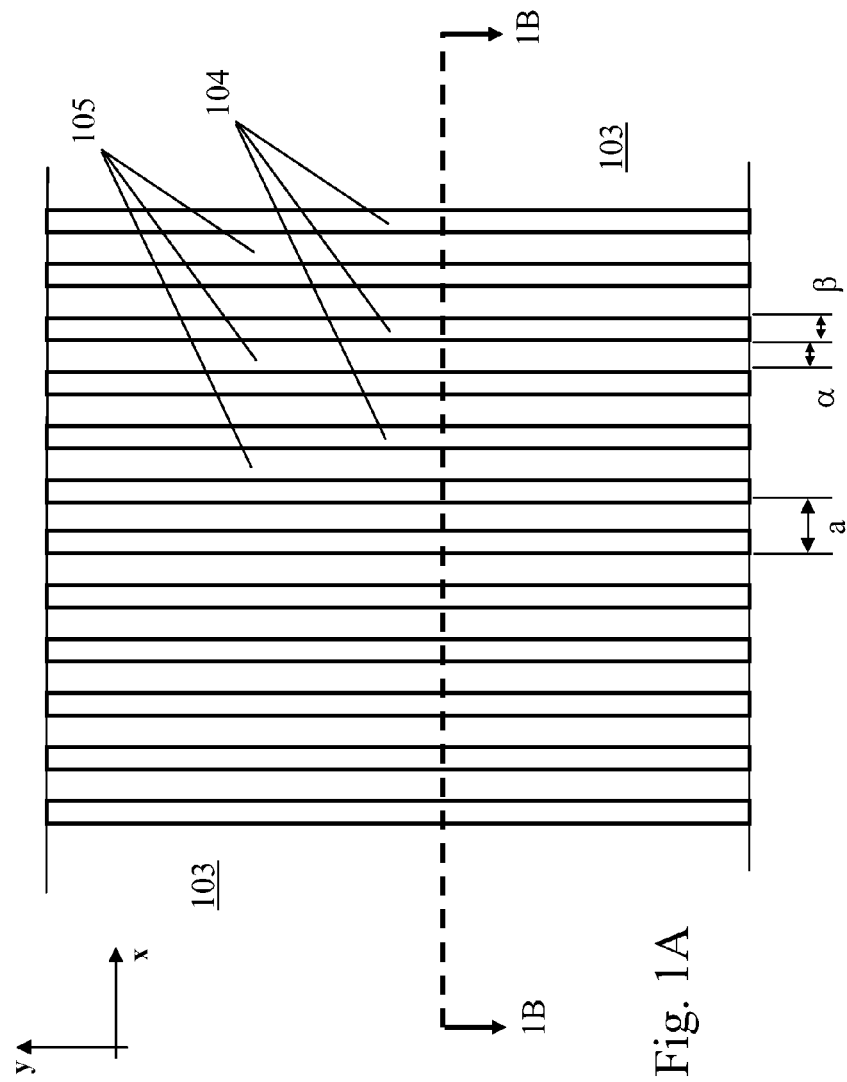
FIGS. 1A and 1B are schematic plan and cross-sectional views, respectively, of a diffraction grating comprising a set of elevated regions and recessed regions.

In many of the drawings, a diffraction grating is shown with a small number of diffractive elements (i.e., grating "lines" or grating ridges/trenches), typically a half dozen or so up to perhaps a few dozen. The number of grating lines shown is typically far smaller than the number of such lines that are actually present on an article (often many dozens, hundreds, or more). The number of grating lines shown is reduced in number for clarity of illustration.

The embodiments shown in the drawings are exemplary, and should not be construed as limiting the scope of the present disclosure or appended claims.

DETAILED DESCRIPTION OF EMBODIMENTS

A centerpiece of many pieces of jewelry is a gemstone (diamond, cubic zirconium, etc.) that produces a pleasing visual appearance by reflecting or refracting incident light from one or more of a multitude of facets. Some light reflected or refracted from the gemstone, particularly light that is reflected from an outer surface of a facet without being transmitted, exhibits no dispersion, i.e., all color components of the light are reflected in essentially the same manner. A viewer whose eye catches such a reflection sees a color representative of the spectrum of the incident light. For example, under typical ambient illumination conditions, the viewer would see white light reflected from the gemstone; other illumination conditions would result in correspondingly different reflected light being seen by the viewer. The sparkles of typically white light produced by facet reflection comprise the so-called brilliance of the gemstone. Light that enters the gemstone to reemerge (with or without internal reflection) can exhibit dispersion as a result of wavelength dependent refraction upon transmission through one or more facet surfaces, i.e., differing constituent colors of the illuminating light emerge propagating along different output directions. Under white light illumination, a viewer of such refracted light would typically see the light as colored because only a portion of the spectral bandwidth of the illuminating spectrum would enter his or her eye. Light emitted by the gemstone that has experienced dispersion comprises the gemstone's so-called fire, which comprises flashes of colored light observed as the viewer, gemstone, or light source move relative to one another.

Both brilliance and fire are important in enabling a gemstone to produce the most pleasant viewing experience. This is similarly true in the case of diffraction gratings or other diffractive structures used to enhance packaging through the creation of attractive visual displays.

Disclosed in various of the incorporated references are jewelry or other decorative or ornamental articles having arrays of diffraction gratings (reflective or transmissive) for producing visual effects including brilliance, fire, or both that appear similar to those of high quality gemstones. The array of diffraction gratings can be arranged so as to reproduce the appearance of facets, even on a substantially planar surface of an article. The array of gratings can be arranged so that the diffracted light appears to emanate in a pleasing manner as from a traditional gemstone. The array of gratings can be arranged so as to create visual effects not found in traditional jewelry or gemstones, for example, the distribution of facets may create visually pleasing patterns that change dynamically (rotate, expand, deform, or otherwise change) with changing relative positions of the observer, the article with the array of gratings, and one or more light sources. The array of gratings can be arranged so as to incorporate an additional optical attribute not found in typical gemstones, namely, a focusing attribute imparted onto light reflected or refracted by the article. The array of gratings can be arranged so as to provide visibility over wide viewing areas or angles. The array of gratings can be combined with one or more refractive elements, or can be attached to a curved surface, to form a visually pleasing article. For example, the placement of a faceted dielectric medium (e.g., glass, crystal, or plastic) over a diffractive surface grating can enhance the perceived beauty of the article by increasing (by refraction through the faceted medium) the number of directions from which diffracted light can be seen and by adding the perception of depth to the article. A grating positioned near or on one facet of a faceted dielectric medium, even a single uniform grating covering an entire facet of the dielectric medium can dramatically enhance the fire observed through multiple of the facets of the dielectric medium.

Arrays of diffraction gratings exhibiting one or more of the attributes recited in the preceding paragraph can be fabricated on the surface of metal jewelry articles (rings, earrings, brooches, pendants, bracelets and such) instead of or in addition to one or more gemstones, and can be used to create unusual visual effects enhancing the visual appeal of such articles.

Diffraction gratings or other diffractive structures possessing at least one of above attributes on a substantially transparent or reflective substrate can be employed to create an attractive visual display for home or workplace decoration, decorative packaging, posters, or other decorative or ornamental articles. If desired, such articles can be mass-produced on a polymer or other inexpensive substrate using embossing, stamping, injection molding, or other suitable replication technique.

A diffractive structure can deflect reflected or transmitted light so as to create a spatial separation of colors. A diffractive structure may appear to an observer to shine in different colors as the relative positions or orientations of the diffractive structure, operative light sources, and the observer's eye change. The diffractive structure can be arranged so that such varying appearance can have a visually pleasing aspect, particularly if the diffractive structure comprises multiple facets each of which has a diffraction grating differing from at least some of the other gratings with respect to one or more of its operative characteristics, e.g., diffractive contour spacing or grating line spacing, grating line orientation, grating line shape (e.g., straight or curved), grating line cross-sectional structure (e.g., height, width, or cross-sectional shape of ridges forming the grating lines), reflectivity, transmissivity, or other optical qualities that affect the manner in which light is diffracted from a given diffraction grating. In a diffractive structure with a multitude of diffraction gratings (i.e., diffractive facets) having differing diffractive characteristics, an observer may see a multitude of sparkles of differing color as the various facets move into and out of positions to diffract specific colors toward the observer. The appearance of the multifaceted diffractive structure can be tailored by judicious choice of the grating attributes of the various facets.

In the creation of visually pleasing decorative, ornamental, or jewelry articles utilizing diffractive structures, it can be desirable to identify structures or fabrication methods that lead to robust, attractive, high-quality items while limiting, reducing, or minimizing manufacturing costs. Various diffraction grating arrangements are disclosed herein that are amenable to lower-cost fabrication methods or result in high-quality or robust decorative, ornamental, or jewelry articles bearing diffraction gratings. The disclosed grating arrangements include transmissive, partially transmissive, reflective, and partially reflective diffraction gratings.

Figure 1B:
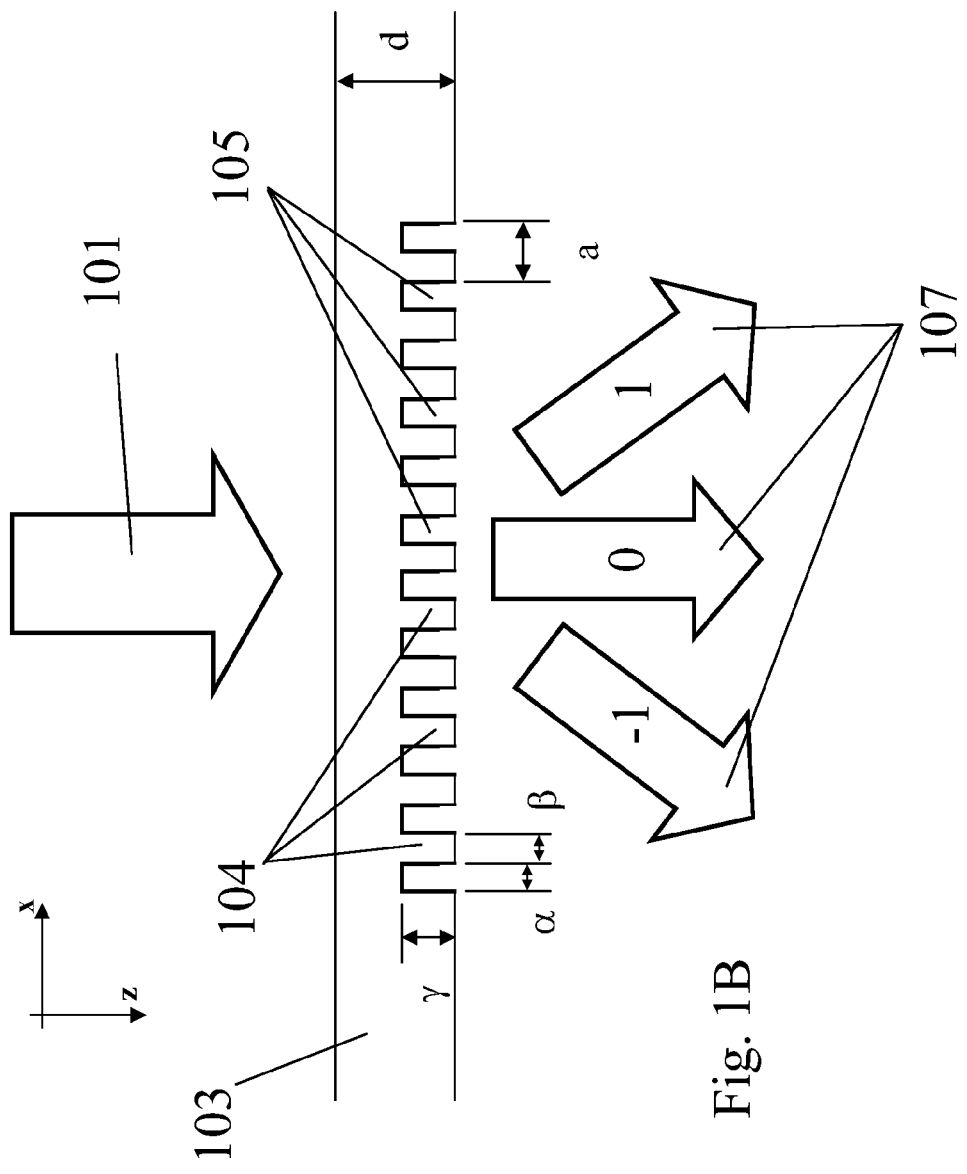

An exemplary transmissive diffraction grating is illustrated schematically in FIGS. 1A and 1B, which can represent a single diffraction grating or a single diffractive facet of a multi-faceted diffractive structure. The exemplary grating comprises a plurality of elongated ridges 104 with intervening trenches or grooves 105. More generally, a diffraction grating can comprises a plurality of spatial regions on a surface that are elevated (e.g., the ridges 104) relative to adjacent, recessed spatial regions of that surface (e.g., the trenches 105), with the elevated and recessed regions being arranged on the surface to provide the desired diffractive behavior. While only a few ridges/trenches are shown in FIGS. 1A and 1B, typically hundreds or thousands are be present in a typical diffraction grating. For a transmissive grating, the ridges 104 and trenches 105 are formed in or on a substantially transparent substrate 103, which can comprise glass (of various suitable types), quartz, silica, sapphire, plastic or polymer, or any other suitable material that is substantially transparent over at least a portion of the visible electromagnetic spectrum. "Substantially transparent" in this context is functionally defined in that the amount of light transmitted through the substrate is sufficient to yield a visually pleasing ornamental, decorative, or jewelry article. The level of transmissivity needed varies according to the typical environment in which the article is intended to be displayed. For example, when displayed in a sunlit environment, lower transmission can be sufficient relative to that needed for display under relatively dimmer interior lighting. The substrate can be colorless and clear (substantially full transmission over the entire visible spectrum), can appear gray (less than full transmission that is substantially uniform over the visible spectrum), or can appear colored (transmission that varies across the visible spectrum), as needed or desired for a particular article displayed in a particular environment.

Ridges 104 and trenches 105 can be formed in or on the substrate 103 in any suitable manner, including but not limited to wet or dry etching techniques or, if the substrate is malleable, by stamping, molding, or similar mechanical processes. The ridges 104 and trenches 105 need not have the rectangular cross-sectional form depicted in the drawings. The ridges and trenches can exhibit rounded corners or edges (as might often arise from a wet etch process, or from some types of stamping and molding processes), tilted or slanted side walls (e.g., yielding trapezoidal ridges/trenches), or the ridges can have a sinusoidal or other curvilinear cross-sectional shape, with a smooth, continuous transition between ridge and trench. The depth of the trenches 105 (equivalently, the height of the ridges 104) can be varied to control the fraction of incident light that is diffracted by the grating. If the trench width $\alpha$ and the ridge width $\beta$ are comparable to one another and if the trench depth $\gamma$ is selected (based on the refractive indices of the ridge material and any material filling the trenches) so that light of a given wavelength transmitted through the substrate trench and ridge regions accrue an optical phase difference of about $\pi$ (or an odd integer multiple thereof), then a substantial fraction the incident light 101 is diffracted to emerge in the $\pm 1$ orders of the output light 107 (the zero-order represents light transmitted directly through the grating without being diffracted). Higher diffraction orders can appear and some fraction of the incident optical signal can be diffracted into those orders as well. Typically, when $\alpha \approx \beta$, a substantial fraction of the diffracted optical signal appears in the $\pm 1$ diffractive orders. If $\alpha$ and $\beta$ differ substantially, diffraction into higher diffractive orders can be favored. The cross-sectional profile of the ridges can be selected to yield a desired distribution of diffracted intensity among various diffracted orders, using conventional techniques for diffraction grating design.

In a many typical decorative, ornamental, or jewelry articles, the parameters $\alpha$ and $\beta$ fall in the range of 0.2-3.0 µm, although larger values are sometimes employed for diffracting light through relatively small angles. An etch depth $\gamma$ of about 500-600 nm in a glass substrate (n$\approx$1.45-1.50), that is viewed in transmission with the trenches filled with air (n$\approx$1), yields an approximate phase difference of about $\pi$ for light transmitted through the ridges or through the trenches and correspondingly efficient diffraction into the $\pm 1$ diffractive orders. More generally, relatively high diffraction efficiency arises when $\gamma \approx \lambda/2\Delta n$, where $\lambda$ is a central representative wavelength of the optical spectrum of interest, and $\Delta n$ is the difference in the refractive index of the ridges and trenches at that wavelength. Instead of air, the trenches can be filled with adhesive, polymer, or other suitably transparent material. For a diffraction grating to be used in reflection, the etch depth would typically be half of that used for a transmission grating to yield suitably optimized diffraction efficiency. The thickness d of the substrate 103 can be any convenient thickness that provides sufficient mechanical stability and compatibility with fabrication tools employed. If the diffraction grating is made on a standard wafer-type substrate using standard photolithographic tools, a typical wafer might have an industry-standard thickness such as 0.675 mm for a 150 mm diameter wafer.

Figure 2:
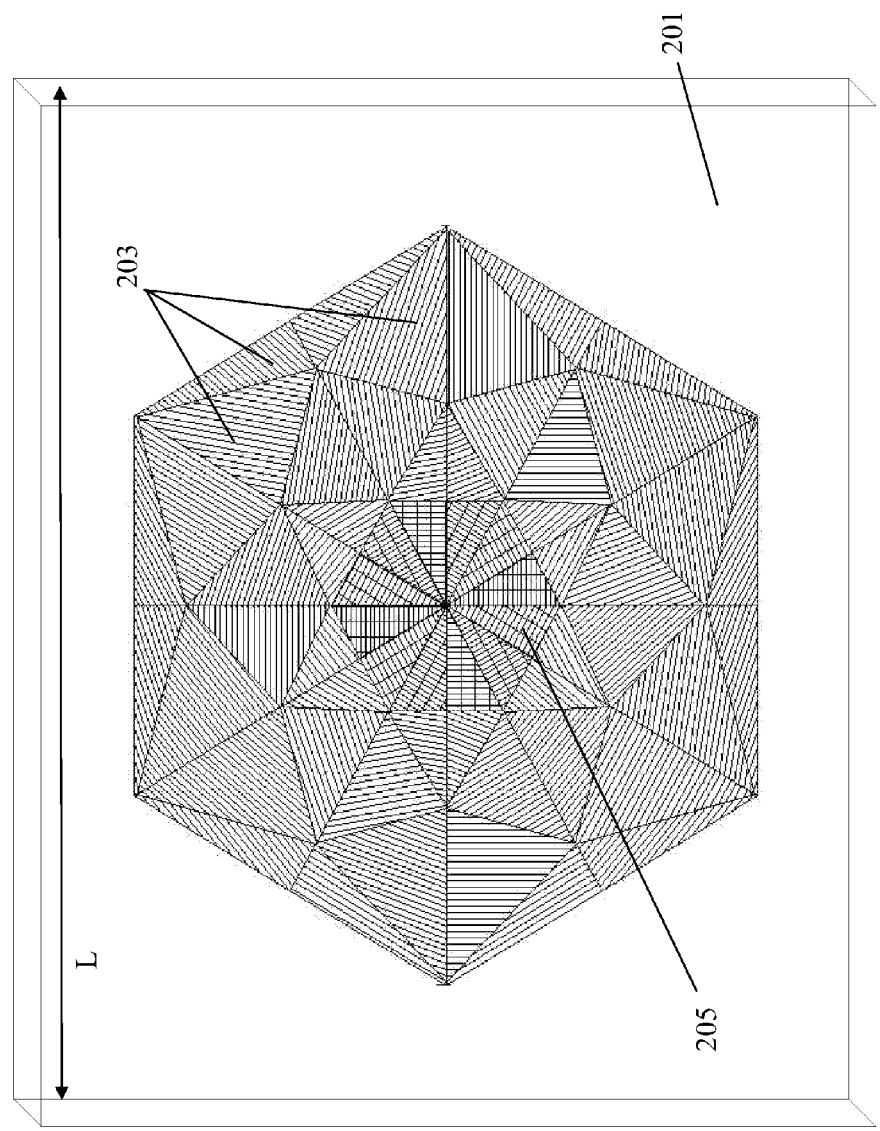
FIG. 2 is a schematic plan view of a diffractive article having multiple diffractive facets.

FIG. 2 illustrates schematically an exemplary multi-faceted diffractive structure. The diffractive structure comprises multiple facets 203. Within each facet 203, diffractive grating "lines" (straight lines, curves, etc.) are formed in a substrate 201. FIG. 1B can be taken as a cross section of the ornament of FIG. 2 showing a region within one facet cut perpendicular to that facet's diffractive contours (i.e., grating lines). In some facets (e.g., facet 205), diffractive contours can cross while remaining within the scope of the present disclosure or appended claims. When grating lines cross, diffractive features of the grating (i.e., the elevated and recessed regions of the grating surface) can resemble posts, holes, polygons, dots, or other shapes rather than only ridges separated by trenches. The exemplary cross-sections shown in the drawings can be viewed as cross-sections of these more generalized elevated and recessed areas of the grating surface, rather than only transverse cross sections of elongated trenches and grooves. Although the elevated and recessed regions are referred to in the present disclosure as ridges and grooves, respectively, that is for convenience of description only and not intended to limit the scope of the disclosure or the appended claims. A diffraction grating comprising a generalized arrangement of elevated and recessed regions of various shapes, sizes, and positions can provide diffractive behavior more generalized and customized than that provided by, e.g., a grating having only straight, parallel grating lines. A transverse dimension L of the substrate 201 can range from millimeter-scale up to centimeter-scale for some types of ornaments, (e.g., earring drops or other jewelry items), or can be significantly larger for an item intended to be hung in a window like stained glass.

Multi-faceted decorative, ornamental, or jewelry articles can be made substantially as shown in the cross-section of FIG. 1B. However, significant drawbacks of that arrangement can be mitigated or eliminated by the arrangements disclosed or claimed herein. Some of the drawbacks of the arrangement of FIG. 1B are: lack of a strong reflected signal; vulnerability of the diffraction grating to contamination, e.g., foreign material entering trenches and disrupting designed phase differentials; a need to form fairly deep trenches (e.g., more than a few hundred nm) when using common substrate materials such as glass; and lack of available polymers having refractive indices that would allow their use to fill and protect trenches in typical, low-cost substrates such as glass or plastic. That last problem arises because many conveniently available polymers have refractive indices close to those of common substrates; use of such polymers to fill the grating trenches significantly reduces the phase difference between ridge and trench, which either weakens the diffracted signal or required increase trench depth to achieve a strong diffracted signal.

Figure 3:
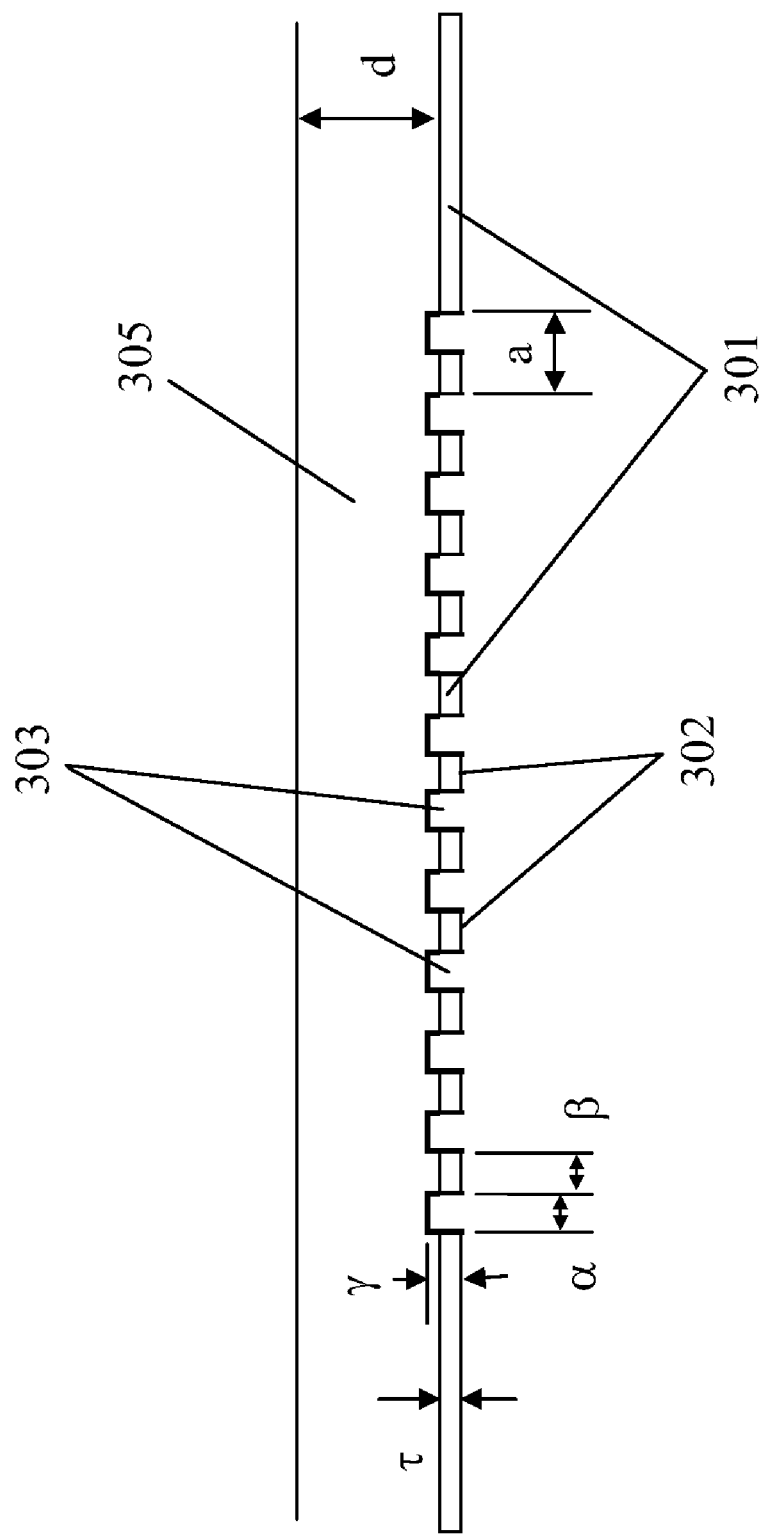
FIG. 3 is a schematic cross-sectional view of an exemplary diffraction grating.

A cross-section of an exemplary embodiment of a diffraction grating that can operate in both reflection and transmission is illustrated schematically in FIG. 3. As with FIG. 1B, the cross-sections of FIGS. 3-7 can represent a single grating or a single diffractive facet of a multi-faceted diffractive structure. Except as noted below, dimensional parameters and materials are typically similar to those described above for FIGS. 1A and 1B. The diffraction grating of FIG. 3 includes a layer 301 of a material that has an optical transmissivity differing from that of substrate 305. The layer 301 can comprise, for example, a reflective metallic or ceramic material (e.g., gold, silver, aluminum, titanium nitride), a substantially opaque material, a colored dielectric material, or a multi-layer reflective dielectric stack. If desired, layer 301 can be chosen to exhibit a transmissivity differential relative to the substrate 305 over only a limited spectral bandwidth, thereby limiting the spectral bandwidth over which the diffractive structure is active. A multi-layer dielectric stack or a doped glass with sharp absorptive spectral features are well suited for use in such a scenario.

The layer 301 can be formed on substrate 305 by vapor phase deposition, chemical vapor deposition, or other suitable deposition or coating process. Ridges 302 and intervening trenches 303 that comprise the diffraction grating can be formed by any suitable spatially selective material processing technique, such as by photolithographic patterning of a photoresist layer over layer 301 and subsequent etching through the layer 301 to expose the substrate 305 at the bottom of the trenches 303. Alternatively, conventional optical interference fringes can be employed with a suitable photoresist for patterning, although such patterning enables more limited grating design options than photolithographic patterning. The etch can be halted precisely upon reaching the surface of substrate 305, or can overshoot into the substrate to avoid the need for precise etch control. It can be desirable to minimize such overshoot to reduce required etch time.

The thickness $\tau$ of the layer 301 is sufficient to create a substantial differential between the optical transmissivity of the ridges 302 (that at least partly comprise the material of layer 301) and trenches 303 over at least a portion of the visible electromagnetic spectrum. For weakly diffractive articles, a differential of only a few percent can be sufficient. For strong diffraction, a larger differential can be employed, including examples in which optical transmission through ridges 302 is nearly zero. If a metal layer 301 is employed (such as aluminum, silver, or gold), a layer about 30-100 nm in thickness would be needed to substantially eliminate transmission through ridges 302. Thicker layers (metal or non-metal) can be employed provided an etch process is employed that can etch through the layer 301 to the substrate 305. Thinner layers can be employed if weaker diffractive strength is desired. In the case of a multilayer dielectric reflector stack, the thickness of layer 301 can range from about 250 nm up to several microns depending on the reflective properties that are desired. Instead of first applying a continuous layer 301 to the substrate 305 and then etching through layer 301 into the substrate 305 to create the diffraction grating, the trenches 303 can be etched directly into the substrate 305 and then a directional (i.e., non-conformal) deposition process directed from the side can be employed to coat the ridges 302 while leaving the trenches 303 substantially free of layer 301.

The embodiment of FIG. 3 can provide several advantages over the arrangement of FIG. 1B. The arrangement of FIG. 1B typically provides substantial diffraction only in transmission. Similarly, if layer 301 reduces optical transmission but is not reflective, then the resulting article typically can provide a visually pleasing appearance by diffraction only in transmission. However, if a reflective layer 301 is employed to form the embodiment of FIG. 3, the resulting diffractive article can provide a visually pleasing appearance by diffraction in transmission or in reflection. The trenches 303 of the embodiment of FIG. 3 need only extend through the layer 301 (perhaps as little as 30 nm for a metal layer), and are therefore often substantially shallower than the trench depths typically required for the arrangement of FIG. 1B. Shallower trenches 303 can be desirable due to reduced processing time or a wider selection of suitable etch processes (e.g., wet etch processes). The trenches 303 of the embodiment of FIG. 3 can be filled with transmissive material without substantially degrading the diffractive strength of the article. Filling the trenches 303 with a stable polymer material or an inorganic dielectric material provides protection of the diffractive surface of the article from damage (e.g., scratches or other mechanical damage) or contamination (e.g., from dust or skin oils).

In an alternative (not shown) to the exemplary embodiment of FIG. 3, a diffraction grating exhibiting similar characteristics and advantages can be formed by depositing the second material (having the differing transmissivity) within trenches formed on a first substrate material (instead of forming the ridges with the second material). Such an arrangement can be more difficult to realize with many typical fabrication techniques. In one example of such an arrangement, a thin layer of epoxy or other polymer having a transmissivity sufficiently different from the substrate can be applied (as a liquid precursor) to the diffractive structure and confined upon curing primarily within the trenches of the diffraction grating.

Figure 4:
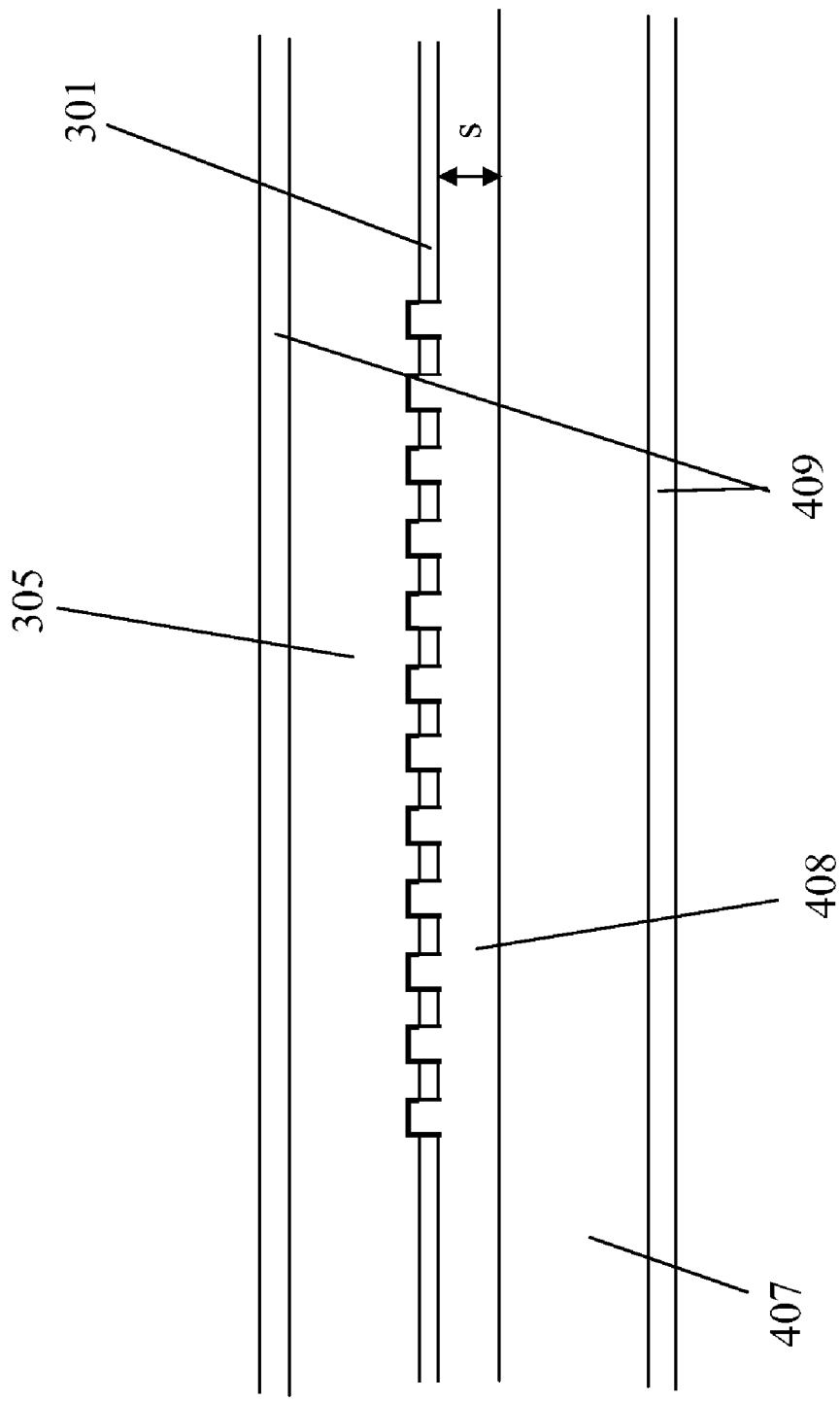
FIG. 4 is a schematic cross-sectional view of another exemplary diffraction grating.

In a further adaptation of the exemplary embodiment of FIG. 3 that is illustrated schematically in FIG. 4, a second substantially transparent substrate 407 can be attached to substrate 305 with the diffraction grating sandwiched between them. The thickness of the second substrate 407 is not critical, but is sufficiently thick to provide adequate protection for the diffraction grating on substrate 305. The second substrate 407 is substantially transparent over at least a portion of the visible electromagnetic spectrum, to the extent that it transmits a sufficient fraction of light diffracted by the diffraction grating on substrate 305 (in transmission or reflection) to yield a visually appealing article. The substrates 305 and 407 can be attached to one another using an adhesive layer 408 that is substantially transparent (over at least a relevant spectral region) and that fills the trenches of the diffraction grating. Alternatively, an adhesive can be employed only at the edges or perimeters of the substrates 305 and 407 (in which case the adhesive need not be transparent). The thicknesss of the adhesive layer 408 can be made as small as practicable to conserve adhesive and to reduce potential optical interference effects between adjacent interfaces. The exemplary article of FIG. 4 is more robust than that of FIG. 1B. If needed or desired, anti-reflection coatings 409 can be applied to one or both of the exterior surfaces of the two substrates 305 and 407 to reduce or eliminate reflections that might otherwise obscure optical effects produced by the diffractive structure. Such anti-reflection coatings can be of any suitable type and can include single-layer and multi-layer dielectric stacks.

Figure 5:
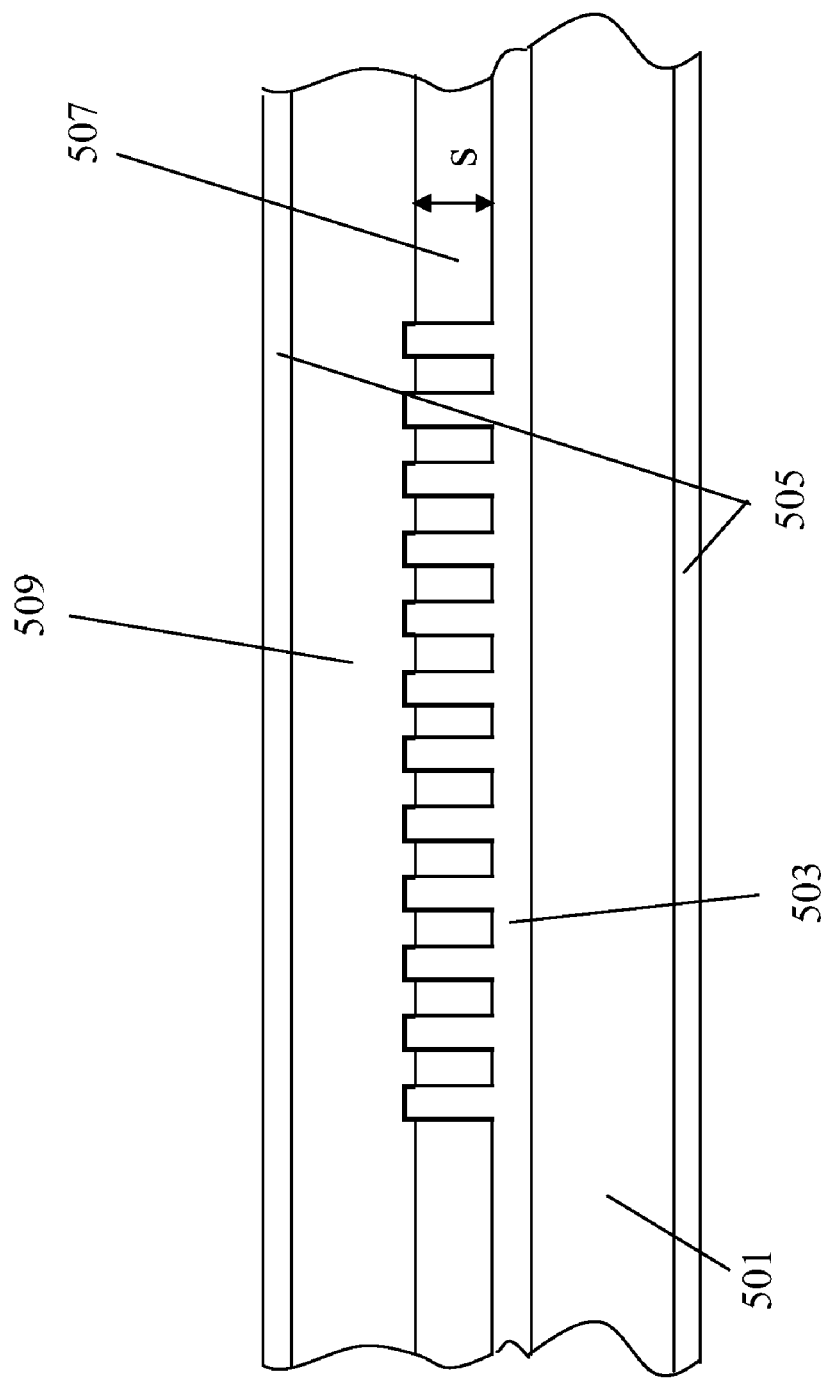
FIG. 5 is a schematic cross-sectional view of another exemplary diffraction grating.

Another exemplary embodiment, that operates primarily in transmission, is illustrated schematically in FIG. 5. A surface layer 507 is deposited on a substrate 509. Both layers are substantially transparent over at least a portion of the visible electromagnetic spectrum. In this example the surface layer 507 is deposited or otherwise formed on substrate 509 and has a bulk refractive index that is differs from that of substrate 509 (and is typically higher). Trenches are etched or otherwise formed in layer 507, leaving ridges at least partly comprising the material of layer 507; the trenches and ridges form a diffraction grating, as previously described. The layer 507 can comprise a relatively high-refractive-index transparent material (e.g., n>2) such as titanium dioxide, cerium oxide, silicon nitride, or other suitable high-index material; alternatively, layer 507 can comprise a lower index material such as sapphire or silicon oxynitride ($SiN_xO_y$). It is advantageous for the layer 507 to have a refractive index at least 0.2 larger than the refractive index of a polymer used to fill the trenches of the resulting diffraction grating (see below). For maximal diffractive strength, the thickness of Layer 507 and the depth of the trenches are selected so that a phase difference of about $\pi$ (or an odd integer multiple thereof) accrues between light transmitted through the ridges and light transmitted through the trenches, as described previously for the arrangement of FIG. 1B. A different phase difference can be employed if less diffractive strength is desired. In contrast to the arrangement of FIG. 1B, the larger index of the ridges in the embodiment of FIG. 5 (due to inclusion of material from high-index layer 507) enables a smaller etch depth to produce a given phase difference. That phase difference and smaller etch depth can still be realized when the trenches are filled with epoxy or other suitable polymer 503, because of the index contrast between the polymer and the high-index material of layer 507. In an example wherein an e-beam-deposited film of titanium oxide (n≈2.3) forms layer 507 and an epoxy layer 503 (n1.5) fills the trenches, the thickness $\tau$ of layer 507 of about 300 nm is adequate for strong diffraction, assuming the trenches are etched most or all of the way through the layer 507. As with the example of FIG. 4, the example of FIG. 5 includes a second substrate 501 attached to the diffraction grating by layer 503. The second substrate 501 protects the diffraction grating from damage or contamination, as described previously. Anti-reflection coatings 505 can be employed on one or both substrate 501 and 509, if needed or desired. The exemplary embodiment of FIG. 5, typically can be arranged to provide strong diffraction in transmission, but does not typically exhibit substantial diffractive strength in reflection.

In the exemplary embodiment of a reflective diffractive article illustrated schematically in FIGS. 6A and 6B, a diffraction grating 601 is formed (by photolithographic etching or other suitable processing method) as a series of ridges and trenches that form a surface relief structure on a substantially transparent substrate 602. The substrate can comprise sapphire, fused silica, glass, plastic, or other suitable transparent material. A reflective layer 603 (metallic or other reflective material) is formed over the diffraction grating 601 by sputtering, e-beam vacuum deposition, or other suitable coating or deposition method. Light propagating through the substrate 602 and incident on the diffraction grating 601 from within the substrate 602 is diffracted in reflection, and the light thus diffracted propagates back through substrate 602 and out of the article.

In the embodiment of FIG. 6A, the reflective layer 603 is sufficiently thin, e.g., 10-500 nm, so that its upper surface approximates the etched surface relief structure of the diffraction grating 601. The thickness of the layer 603 that preserves the surface relief structure while also providing sufficient reflectivity varies according to the method or technique employed to deposit layer 603. A relatively thinner layer is needed if a substantially conformal deposition process is employed, i.e., one that coats the sides of the grating ridges with the same thickness as the tops of the ridges and the bottoms of the trenches (as shown in FIG. 6A). A relatively thicker layer (as shown in FIG. 6B) can be employed if a highly directional or non-conformal deposition process is employed (i.e., one that preferentially coats the tops of the ridges and the bottoms of the trenches). If such a directional process is used at normal incidence to substrate 602, the surface relief structure of the grating 602 can be at least approximately replicated on the surface of layer 603, in some cases even if the trenches are filled by layer 603. In either case, a protective, substantially transparent second substrate 604 can be attached to the article on layer 603 using, e.g., a layer of epoxy or other substantially transparent polymer or adhesive 605. Any suitable alternative means can be employed to attach substrate 604 to the article. Instead of attaching a second substrate 604, layer 603 and its surface relief structure can be coated (e.g., using e-beam vacuum deposition or other suitable method depending on the material employed) with a substantially transparent protective layer comprising silica, aluminum oxide, epoxy or other polymer, or other suitably robust or scratch-resistant material.

The diffraction grating 601 in the embodiments of FIGS. 6A and 6B provides diffraction (in reflection) of light incident on layer 603 from within substrate 602 or from within substrate 604 (and layer 605, if present). A visually pleasing display can therefore be viewed in reflection from either side of the article. Use of precious metals for the reflective layer 603 (e.g., gold, platinum, silver, or others) or semi-precious materials for the transparent substrates 602 and 604 (e.g., sapphire, lead crystal or others) can enhance the attractiveness of the article. To achieve near maximal diffraction, the trenches of the grating 601 can be made approximately a quarter-wavelength deep, the wavelength referring here to the in-medium (substrate 602, substrate 604, or layer 605 as appropriate) wavelength near the middle of the relevant spectral band (typically 500-550 nm if the entire visible spectrum is relevant). Trenches deviating from that quarter-wavelength also provide diffraction, but at correspondingly lower efficiency or shifted to a different center wavelength. All such variations shall fall within the scope of the present disclosure or appended claims.

Figure 7:
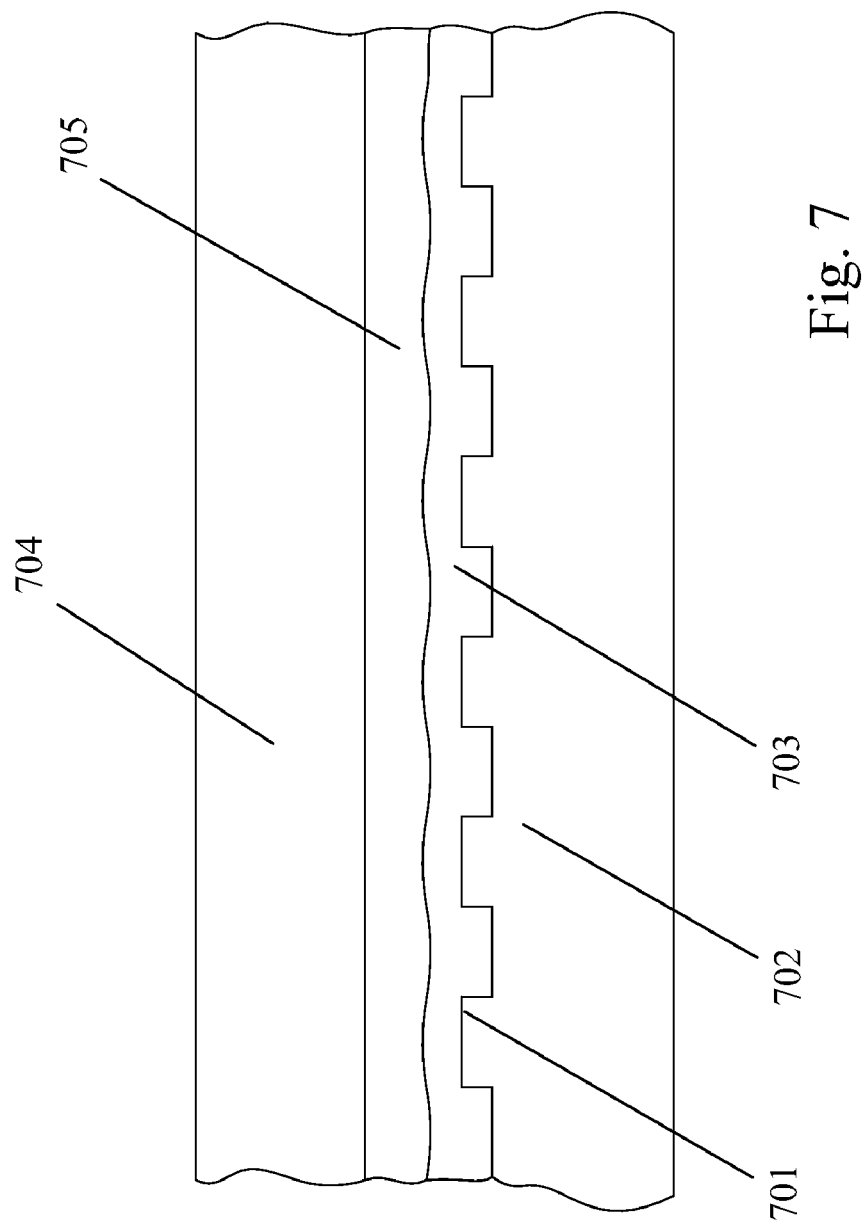
FIG. 7 is a schematic cross-sectional view of another exemplary diffraction grating.

The exemplary embodiment of FIG. 7 is a variant of those of FIGS. 6A and 6B. In FIG. 7, a diffraction grating 701 comprising ridges and trenches is formed on a substantially transparent substrate 702. Substrate 702 can comprise sapphire, fused silica, plastic, or other suitable transparent material. A reflective layer 703 (metallic or other reflective material) is deposited, using sputtering, e-beam vacuum deposition, or other suitable coating or deposition method, over the diffraction grating 701. The reflective layer 703 is sufficiently thick to fill the trenches of the diffraction grating 701 and to provide a relatively flat (or at least substantially non-diffractive) upper surface. The thickness of layer 703 need not be controlled with particular precision, provided that it is thick enough to provide the desired level of reflectivity. The diffraction grating 701 in this embodiment can diffract light incident only from within substrate 702; light incident on the other surface of layer 703 (i.e., from outside substrate 702) is not typically diffracted. A protective second substrate 704 can be attached to the article over layer 703, using a layer 705 of epoxy or other adhesive or using any other suitable means. Alternatively, layer 703 can be coated (e.g., using e-beam vacuum deposition or other suitable methods) with a substantially transparent protective layer comprising silica, aluminum oxide, or other suitably robust or scratch-resistant material. If the reflective layer 703 is sufficiently robust, or if in use it will not be exposed to the environment, a protective layer (deposited or attached) can be omitted altogether.

Because the visually pleasing diffracted light pattern can be viewed only from one side of layer 703 (through substrate 702), the embodiment of FIG. 7 is suitable for use in jewelry of other decorative or ornamental articles in which only one side of the article is typically visible. For example, the article of FIG. 7 could be mounted in a ring so that only one side of the article is visible.

In various exemplary embodiments, a diffraction grating is used only in reflection either from one surface of the grating or from both surfaces of the grating. In other exemplary embodiments, a diffraction grating is used in both reflection and transmission, with light incident on one or both surfaces of the grating. In still other exemplary embodiments, a diffraction grating is used only in transmission. For a diffraction grating intended to be used only in reflection from only one of its surfaces, a transparent or non-transparent substrate can be employed to support the grating on its non-incident surface. A substrate supporting the reflective grating on its incident surface (which therefore transmits both incident and diffracted optical signals) is substantially transparent. If used in transmission, in both transmission and reflection, or in reflection from both grating surfaces, then any substrate supporting the grating on either grating surface must be substantially transparent. In some exemplary embodiments, the diffraction grating can be positioned between two substrates. In those cases at least one of the substrates is substantially transparent, and both substrate are substantially transparent if the "sandwiched" grating is used in transmission or in reflection from both surfaces.

Figure 8:
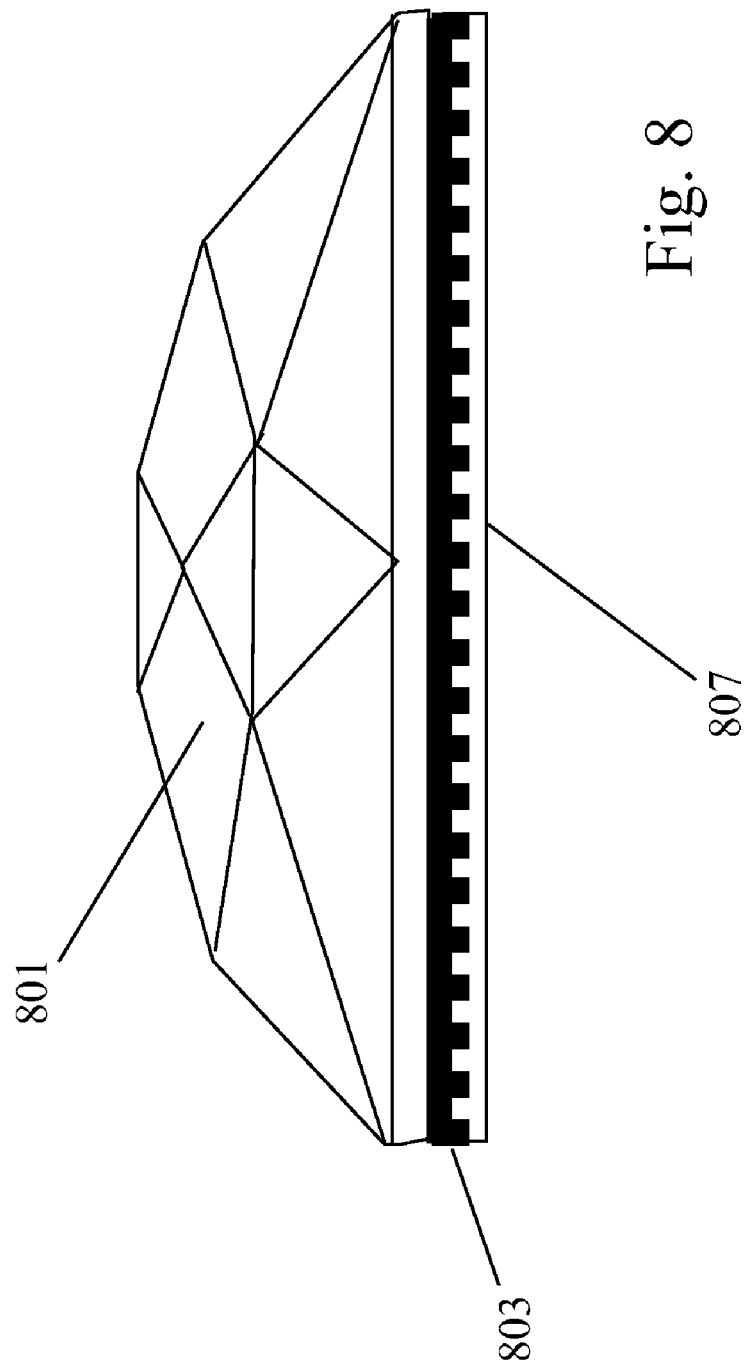
FIG. 8 is a schematic cross-sectional view of another exemplary diffraction grating on a faceted volume of dielectric material.

An exemplary embodiment of a diffractive article is illustrated schematically in FIG. 8. A visually pleasing article is achieved in this example by a combination of refraction, diffraction, and reflection. A substrate 801 comprises lead crystal, glass, a gemstone (precious or semi-precious), plastic, or other at least partially transparent material and provides a number of faceted reflective/refractive surfaces. On at least one facet, typically (but not necessarily) a large one as is found in rhinestones and similar decorative articles, a diffractive structure 803 is formed or attached. The diffractive structure can be etched or molded directly into the substrate. If molded, heated glass or polymer or other at least partially transparent material is shaped by a mold having at least one wall that is patterned according to the desired diffractive structure. Alternatively, if the substrate is a hard material like glass or sapphire or other appropriately transparent material, a thin layer of deformable polymer such as acrylic, polycarbonate, or PET (polyethylene terephthalate) can be deposited on a facet and then patterned by stamping, molding, or other suitable method. In one example, a stamp bearing a surface is patterned according to the desired diffractive structure is pressed against the deformable polymer with sufficient force and at adequate temperature so that the pattern is transferred to the polymer. The deformable layer can be as thin as approximately one-half micron or can be as thick as is convenient for fabrication and handling. The diffractive pattern depth is typically about a quarter-wavelength for mid-band light as measured in the layer material. The deformable material should be sufficiently transmissive to produce a visually pleasing display.

Regardless of the manner in which the diffractive pattern is formed on one or more facets of the substrate 801, the resulting diffraction grating can be of any suitable arrangement, including a single grating, a multi-faceted grating, or any of the arrangements disclosed herein or in the incorporated references. Regardless of the manner in which the diffraction grating is formed on one or more facets of substrate 801, a reflective layer 807 can be deposited over grating 803 on the diffractive facet with sufficient depth to reflect a desired fraction light incident from within substrate 801. The reflective layer 807 can comprise a reflective metal (e.g., gold, silver, aluminum, and so on) or can comprise one or more layers of dielectric material suitably robust or convenient to apply.

The embodiment of FIG. 8 can be particularly pleasing in appearance because it combines refractive/reflective effects long prized in gemstones and crystals with diffractive effects. Diffractive effects often accentuate fire and increase the spread of angles over which output light is generated and observable. Decorative articles arranged in a manner similar to that shown in FIG. 8 typically exhibit varying, somewhat subdued colors nearly constantly as an observer moves relative to it. In contrast, a classic faceted gem tends to produce brief bursts of color as the angle of observation changes.

While layer 807 is shown in FIG. 8 as having a substantially flat (i.e., non-diffractive) bottom surface (for example, arranged as in FIG. 7), layer 807 can instead be arranged in a manner similar to the embodiments of FIG. 6A or 6B) so that diffraction occurs for light incident on both sides of layer 807. A protective additional layer or a protective additional substrate can be applied over the reflective layer 807, if needed or desired. Alternatively, a second faceted or curved substrate, perhaps similar to substrate 801, can be attached over grating 803 (and layer 807, if present), to provide reflective or refractive redirection of incident and diffracted optical signals on both side of the grating.

Figure 9A:
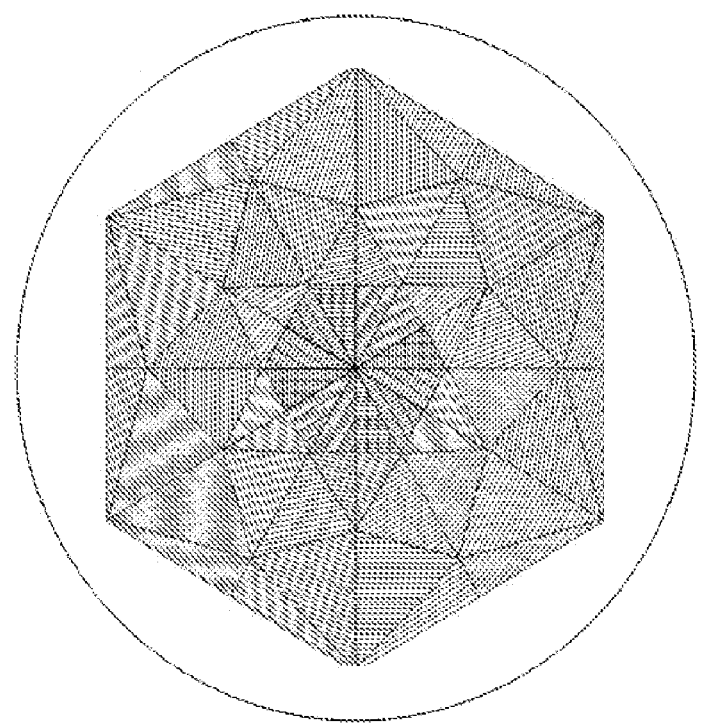
FIGS. 9A and 9B are schematic plan and cross-sectional views, respectively, of another exemplary diffraction grating between two volumes of dielectric material.
Figure 9B:
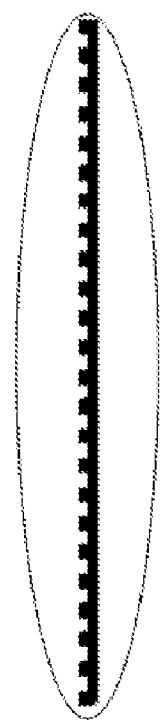

An example of such an embodiment is illustrated schematically in FIGS. 9A and 9B. A single- or multi-faceted diffraction grating can be formed to diffract incident light in reflection, transmission, or a combination of reflection and transmission, a variously described herein and is enclosed within curved substrates on both sides. In an exemplary process for fabricating the item of FIGS. 9A and 9B in volume, a diffractive structure can be formed to cover an area of a first substrate that is many times larger than the finished article. A second, similarly sized substrate is attached over the grating layer. The resulting large "sandwich" structure can then be divided into individual articles using any suitable cutting tools or implements, such as a dicing saw for cutting straight-line patterns yielding polygonal articles, or a coring tool or hole saw for producing circular articles. The separated articles can be finished or polished in any suitable way (e.g., in a rotary or vibrational tumbler) to yield the final product having smoothed corners and edges and polished surfaces similar to precious or semi-precious stones used in jewelry settings.

Rather than forming a diffraction grating directly on a facet of a gem, bead, rhinestone, or other decorative article, a diffractive grating pattern can be stamped, embossed, or molded onto a flexible film, such as a polymer or metal film. The patterned film is then attached (e.g., using adhesive) to the desired location on the decorative article (illustrated schematically in FIG. 10). A metal film thus patterned diffracts only in reflection (from one or both sides, depending on the arrangement and the nature of the article to which the metal film is attached). A transparent film thus patterned can have a reflective coating applied (metallic or otherwise) to enhance diffraction in reflection. As described elsewhere, the patterned grating film can be arranged to diffract only on one side or to diffract on both sides, by reflection (from both sides) or by a combination of transmission and reflection (from one or both sides). If arranged to diffract from both sides, the diffractive film can be adhered, for example, between two decorative articles such a flatback rhinestones to produce a richly faceted item with exquisite fire.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. An article comprising at least one surface bearing at least one optical diffraction grating, wherein:
   (a) the article comprises a first dielectric material that is substantially transparent over at least a first region of the visible electromagnetic spectrum;
   (b) the diffraction grating comprises a plurality of elevated spatial regions and recessed spatial regions;
   (c) the diffraction grating further comprises a second dielectric material that is substantially transparent over at least a portion of the first spectral region and that substantially covers the elevated and recessed regions;
   (d) the diffraction grating further comprises a third dielectric material having optical transmissivity differing from that of both the first and second dielectric materials or having a refractive index differing from that of both the first and second dielectric materials over at least a portion of the first spectral region;
   (e) either (i) at least a portion of each elevated region comprises the first dielectric material and the third dielectric material at least partly fills the recessed regions or (ii) at least a portion of each elevated region comprises the third dielectric material and the second dielectric material substantially fills the recessed regions; and
   (f) the third dielectric material is absent from certain areas of the diffraction grating so that the first and second dielectric materials are in contact in those areas from which the third dielectric material is absent.

2. The article of claim 1 wherein the elevated regions comprise elongated ridges and the recessed regions comprise trenches between the ridges.

3. The article of claim 1 wherein the article comprises a volume of the first dielectric material having at least one faceted or curved surface.

4. The article of claim 1 further comprising a mount attached to the first dielectric material, wherein the article is an item of jewelry.

5. The article of claim 1 wherein the second dielectric material comprises a polymer.

6. The article of claim 5 further comprising a substrate positioned on the second dielectric material with the second dielectric material between the substrate and the first dielectric material, wherein the substrate is substantially transparent over at least a portion of the first spectral region.

7. The article of claim 1 wherein the third dielectric material exhibits optical transmissivity less than that of both the first and second dielectric materials over at least a portion of the first spectral region.

8. The apparatus of claim 7 wherein the third dielectric material comprises a reflective layer so that the diffraction grating is arranged to diffract incident light both in transmission and in reflection.

9. The article of claim 7 wherein the third dielectric material is substantially opaque over at least a portion of the first spectral region.

10. The article of claim 7 wherein the third dielectric material exhibits optical absorption over at least a portion of the first spectral region.

11. The article of claim 1 wherein the third dielectric material exhibits a refractive index greater than that of both the first and second dielectric materials over at least a portion of the first spectral region.

12. The article of claim 11 wherein a thickness of the third dielectric material and the respective refractive indices of the first, second, and third dielectric materials result in a relative phase difference of about $\pi$ between light propagating through the recessed regions and light propagating through the elevated regions, the light propagating at a selected design optical frequency.

13. The article of claim 11 wherein the refractive index of the third dielectric material exceeds that of both the first and second dielectric materials by more than about 0.2.

14. The article of claim 1 wherein the recessed regions comprise etched portions of the first dielectric material.

15. The article of claim 1 wherein the third dielectric material is absent from the elevated regions so that the first and second dielectric materials are in contact in the elevated regions.

16. The article of claim 1 wherein the third dielectric material is absent from the recessed regions so that the first and second dielectric materials are in contact in the recessed regions.

17. The article of claim 1 wherein the third dielectric material is absent from sidewalls connecting the elevated and recessed regions so that the first and second dielectric materials are in contact at the sidewalls.

18. The article of claim 1 wherein the third dielectric material exhibits optical transmissivity greater than that of both the first and second dielectric materials over at least a portion of the first spectral region.

19. The article of claim 1 wherein the third dielectric material exhibits a refractive index less than that of both the first and second dielectric materials over at least a portion of the first spectral region.

* * * * *